UNITED STATES PATENT OFFICE.

KARL STEPHAN AND PAUL HUNSALZ, OF BERLIN, GERMANY, ASSIGNORS TO CHEMISCHE FABRIK AUF ACTIEN, (VORM. E. SCHERING,) OF BERLIN, GERMANY.

PROCESS OF MAKING CAMPHOR.

No. 801,483.     Specification of Letters Patent.     Patented Oct. 10, 1905.

Application filed April 18, 1905. Serial No. 256,307.

*To all whom it may concern:*

Be it known that we, KARL STEPHAN and PAUL HUNSALZ, subjects of the German Emperor, residing at Berlin, Kingdom of Prussia, German Empire, have invented a new and useful Improvement in Processes of Manufacturing Camphor, of which the following is a specification.

It is known that borneol or isoborneol can be transformed into camphor by such oxidizing agents as chromic acid, permanganate, and the like. All these processes have the drawback that the products formed by the reduction of the oxidizing agent—for example, salts of chromic oxid—are mixed with the camphor and render its purification more difficult. Camphor may, however, be obtained without difficulty and without any troublesome admixture when ozone is used as the oxidizing agent. It was by no means obvious that the oxidation could be produced without difficulty by means of ozone. Apart from the fact that by no means all oxidizing agents are successful, the action of manganese and sulfuric acid upon isoborneol, for example, producing mainly aldehydes, it was to be expected that the use of ozone might lead to the formation of additive products which by reason of their tendency to explode would have rendered the process technically impossible. Further, it may be remarked that while other oxidizing agents transform the camphene into camphor the action of ozone upon camphene produces no camphor, but only camphenilon and formic aldehyde.

Example 1: Ten kilos of isoborneol are dissolved in forty kilos of petroleum-ether boiling at a low temperature and ten kilos of water added. The quantity of ozone necessary for the oxidation is then led in at the ordinary temperature. When the reaction is complete, a portion of the petroleum-ether is distilled off, the camphor being thereby caused to crystallize.

Example 2: Ten kilos of borneol are dissolved in seventy-five kilos of ninety-five-per cent. acetic acid and ozone at the ordinary temperature passed through until the greatest part escapes practically unchanged. The main portion of the acetic acid is then distilled off, the residuum is diluted with water, neutralized with soda, and the deposited camphor purified by known means.

In referring in the claims to "borneol" we desire to embrace by this term also isoborneol as an equivalent for the purposes of this invention.

We claim as our invention—

1. The process of manufacturing camphor which consists in oxidizing borneol by means of ozone and separating the resulting camphor, substantially as set forth.

2. The process of manufacturing camphor which consists in dissolving borneol by a suitable liquid solvent, conducting ozone into the solution, and separating the resulting camphor, substantially as set forth.

In testimony whereof we have signed our names to this specification in the presence of two subscribing witnesses.

KARL STEPHAN.
                 PAUL HUNSALZ.

Witnesses:
    WOLDEMAR HAUPT,
    HENRY HASPER.